United States Patent [19]

Egly

[11] 4,289,235
[45] Sep. 15, 1981

[54] MAGNETIC CASSETTE STORAGE CASE

[76] Inventor: Robert A. Egly, 1630 Marguerite Ave., Corona del Mar, Calif. 97625

[21] Appl. No.: 76,252

[22] Filed: Sep. 17, 1979

[51] Int. Cl.³ .................... B65D 85/67; B65D 5/50
[52] U.S. Cl. ............................ 206/387; 206/45.15; 220/339
[58] Field of Search .................. 206/387, 45.13, 45, 206/45.15, 39; 220/339

[56] References Cited

U.S. PATENT DOCUMENTS

| 2,427,281 | 9/1947 | Liebson | 206/45 |
| 2,775,342 | 12/1956 | Smith | 206/45.13 |
| 3,640,379 | 2/1972 | Weingarden | 206/387 |
| 3,702,132 | 11/1972 | Fites et al. | 206/387 |

FOREIGN PATENT DOCUMENTS 1353 4/1979 European Pat. Off. ........... 206/39

*Primary Examiner*—William T. Dixson, Jr.
*Attorney, Agent, or Firm*—George F. Bethel; Patience K. Bethel

[57] ABSTRACT

A magnetic cassette storage enclosure is described in the following specification, configured as a book-like pair of overlying covers that are hinged along a side analogous to a binding. One of the covers has a pivotal tray-like insert connected thereto that can be laid between the enclosure formed between the two covers. The tray-like insert has shelves or ledges formed in staggered relationship on the tray-like insert. The staggered shelves or ledges have a protuberance which locks a magnetic cassette into the tray while tabs receive the cassette spindle openings to prevent them from moving. The protuberances are spaced above the shelves or ledges. They are formed of a resilient material which can be flexed so as to frictionally engage the magnetic cassettes when inserted between the protuberances and the respective ledges in their staggered relationship. The second cover which is not connected to the tray-like insert has an outer sidewall therearound which forms an internal cavity or enclosure for the entire insert to maintain the magnetic cassettes in a dust-free environment. The insides of the top and bottom covers enclose the tray when they are laid in overlying relationship to each other and the entire holder can be formed from plastic with living hinges for providing ease of manufacture, as well as opening and closing of the case.

13 Claims, 14 Drawing Figures

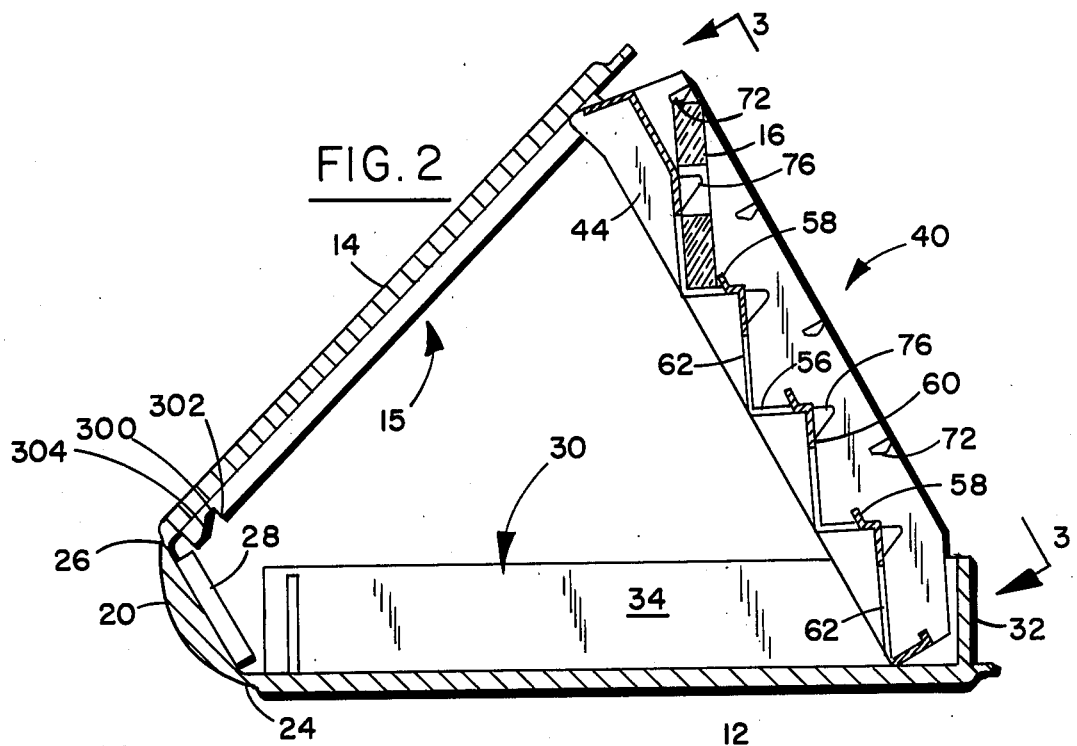
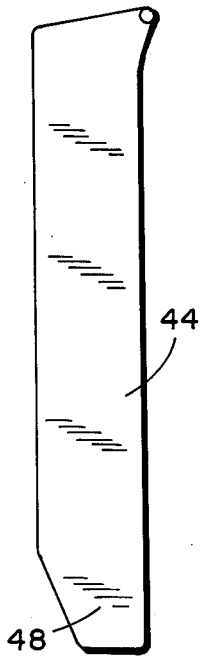
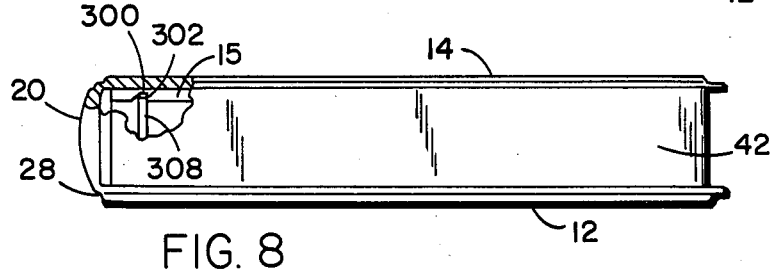
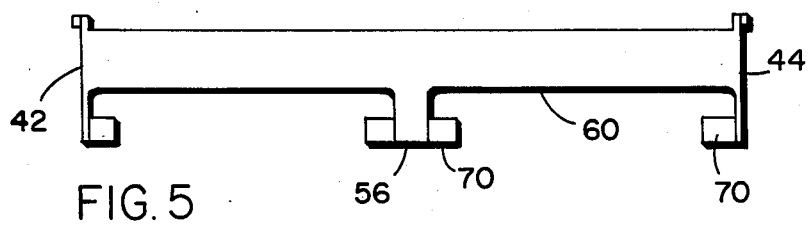
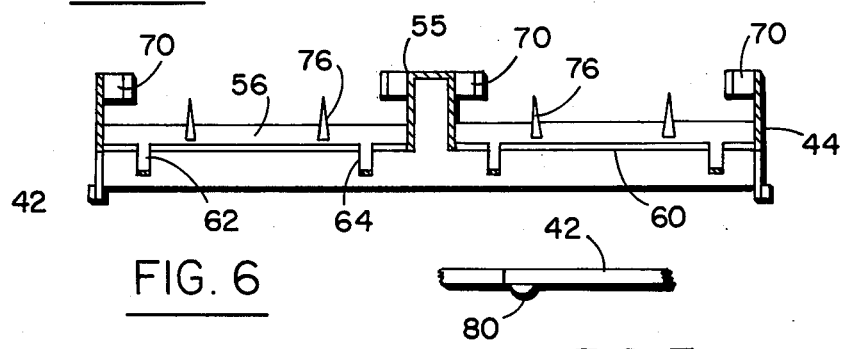

MAGNETIC CASSETTE STORAGE CASE

BACKGROUND OF THE INVENTION

1. Field of the Invention

The field of this invention lies within the computer, electronic and audio cassette art. It particularly lies within the magnetic cassette storage art, wherein magnetic cassettes can be stored or indexed for use and presented for ease and facility in handling.

2. The Prior Art

The prior art related to cassette storage has been provided in various forms of storage. However, the storage can be classified as being casual, at best. In some cases, the magnetic cassettes are stored loosely and left to lie around gathering dust. The dust and dirt on a magnetic cassette, particularly when it is being used for audio or computer usage, creates substantial problems, insofar as fidelity and accuracy. As can be appreciated, when playback is distorted in either a computer or other digital recording and playback systems, the information is worthless.

Recently, certain attempts have been made to store magnetic cassettes in containers. Some of these containers have been individualized or have provided a stacked relationship. However, most of these have been in the form of inappropriately designed devices and configurations.

To say the least, all of the foregoing cassette storage means have been inordinately cumbersome or open. This invention overcomes the fragility, as well as the open nature of prior art storage means. It enables a user or operator to make use of stored cassettes in a facile and ready manner. This is accomplished by way of a unique storage system which will be amplified upon hereinafter.

The storage container of this invention fundamentally incorporates a pair of covers. The covers are of a book-like configuration having a binder. One of the covers has a wall or ledge around it that serves to provide the sidewalls of the container when the covers are placed in overlying relationship like the covers of a book. The upper cover serves the function of providing not only a cover, but also a pivotal support for a tray-like insert that holds the magnetic cassettes.

The tray-like insert is hinged to one of the covers by means of a spindle or other hinge means. The tray-like insert has a number of ledges or shelves. Each ledge or shelf has a frontal flange for receiving a cassette. Behind each shelf or ledge is a backing which stops the cassette from inordinate movement. The frontal flange or lip receives the base of the cassette. The frontal flange or lip extends upwardly from the shelf so that the cassette is held at its bottom. Overlying the cassette and extending from a pair of adjacent sidewalls on either side of the cassettes are protuberances or tabs. The tabs are resilient in nature and allow a frictional holding of the cassette between the ledges and the tabs.

In addition to the foregoing features, the backing has a pair of tabs that extend into the openings of the reels of the cassette to prevent movement thereof.

The tray-like insert can be provided with dividers so that a staggered series of cassettes can be placed on step-like ledges in two rows divided by a wall. The staggering of the cassettes allows them to be placed in stacked relationship in a tighter configuration than if they were placed end to end or side by side.

The overall ease and maintenance of implacement and removal behind the resilient tabs is enhanced so that placement and removal can be done easily through merely the insertion of the cassette against a spring loaded frictional tab and later removal thereof. Furthermore, the cassettes are easily displayed toward the operator's view. When finished, they are stored readily by merely folding the tray-like member internally into the covers to provide dust-free, safe and easy maintenance of the cassettes.

The entire enclosure can be formed of plastic with living hinges at the joindure of the covers.

As will be seen from the following disclosure, the foregoing invention creates a substantial step over the prior art related to magnetic cassette storage.

SUMMARY OF THE INVENTION

In summation, this invention comprises a foldable enclosure of a book-like configuration having a tray-like insert with shelving or ledges that receive magnetic cassettes. More particularly, the invention incorporates a cover which is normally the base of the enclosure when it is in the open position having a ledge or sidewall therearound. An upper cover is hinged to the lower cover by means of a living hinge which supports the tray-like insert with the shelving thereon.

The insert is pivotally supported on the upper cover by means of a pintal so that it can swing backwardly and forwardly between the two covers. In the closed position it can rest against the inside surface of the upper and lower covers. In the open position, it can be placed against the lower cover within the wall or ledge therearound, forming a triangular orientation with the covers.

The tray-like insert has a number of staggered shelves or ledges. The staggered shelves or ledges have flanges at the forward portion thereof that are suitable for holding the base of a cassette. The tray-like insert has two walled staggered series of shelves with walls on the outside and an interior dividing wall. Spanning the interior dividing walls and the outside walls are the shelves or ledges that are supported thereby.

A backing member spans a section between the walls and can be formed as a downward portion of the ledge holding the cassettes so that it serves to maintain the cassette in the back portion of the tray-like insert from falling therethrough.

Extending from the walls are tabs or protuberances which hold the top of the cassette in a frictional engagement between the protuberances and the respective shelving or ledges. The protuberances can be provided as tabs or bumps for frictionally engaging the cassettes.

Extending from the backup member spanning the walls are a pair of tabs which are received within the reel openings of the cassette. These not only hold the cassettes in indexed relationship, but also prevent the reels from rotating when implaced.

The entire enclosure provides for a staggered relationship to the cassettes so that optimum storage is facilitated. The orientation of the cassettes is also such that they are resting against the bottom of the enclosure, when the enclosure is folded together. This prevents dislodgement of the cassettes when they are implaced in the enclosure and the enclosure is moved.

The entire enclosure allows the tray-like insert to be implaced and secured therebetween in a dust-free and dirt-free environment. When the cassettes are stored, the enclosure can be stacked like a book on a shelf, or stacked like boxes.

The enclosure is provided with living hinges that are formed from a plastic injection molding process so that the tray-like insert and enclosure covers can be easily made on an injection molding machine. This thereby facilitates ease and cost effectiveness in manufacture, while at the same time creating a desirable product.

BRIEF DESCRIPTION OF THE DRAWINGS

The invention will be more clearly understood by reference to the description below taken in conjunction with the accompanying drawings wherein:

FIG. 2 shows a sectional view of the step-like ledges in the direction of lines 2—2 of FIG. 1 with a cassette stored therein;

FIG. 4 shows a side view of the sidewalls of the tray-like insert in the direction of lines 4—4 of FIG. 3;

FIG. 5 shows a top plan view of the tray-like insert looking down on the securement tabs and ledges thereof in the direction of lines 5—5 of FIG. 3;

FIG. 6 shows a sectional view of the reel support tabs, the frictional engagement tabs for holding the cassette, and the insert as seen in the direction of lines 6—6 of FIG. 3;

FIG. 7 shows an alternative view of the frictional protuberance holding means of this invention in the direction of lines 7—7 of FIG. 1 when formed in the alternative;

FIG. 8 shows a side elevation view of the enclosure when the covers are closed;

DESCRIPTION OF THE PREFERRED EMBODIMENTS

Figure 1:
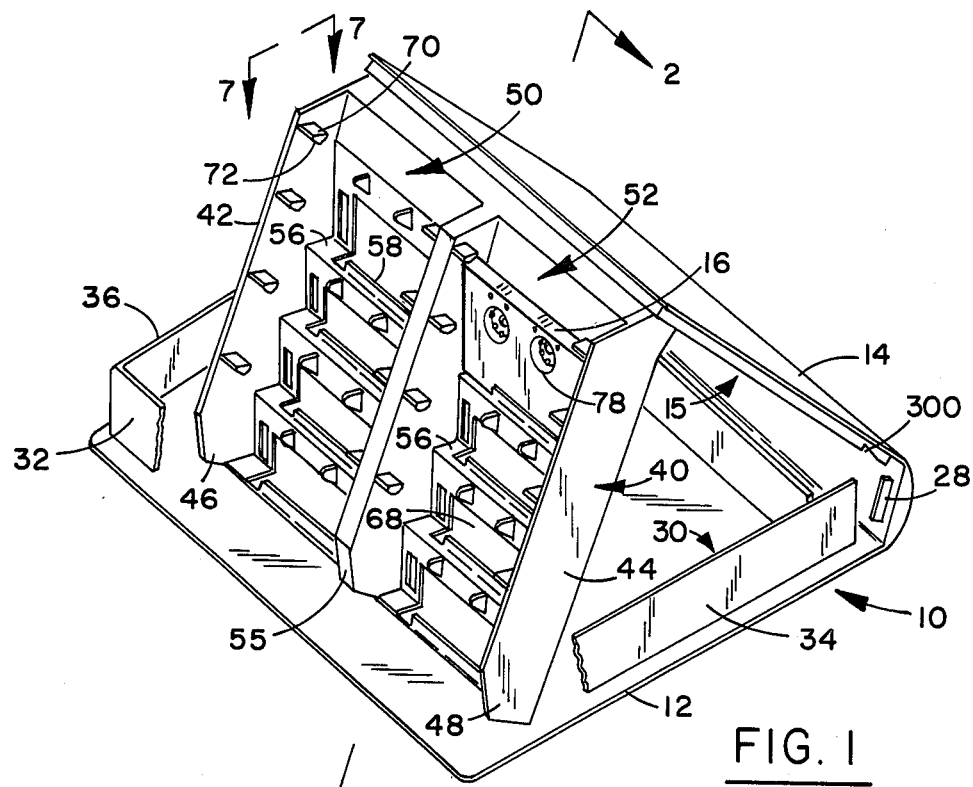
FIG. 1 shows a perspective view of the magnetic cassette storage case of this invention with the tray-like insert in an open and display functioning position.

Looking more particularly at FIG. 1 and the ancillary figures related thereto, which constitute the remaining figures, a container or enclosure 10 is shown. The container 10 has a first cover 12 and a second upper cover 14 with an upper three sided flange 15 surrounding the three sides of the upper cover. The two covers 12 and 14 are respectively placed in an angular upper and horizontal lower position when the container is opened.

A magnetic cassette storage member 16 has been implaced in the cover. The magnitude cassette storage member is a standard cassette which is sometimes referred to in common parlance as a cassette. Such cassettes are utilized for small computer program storage, audio recording and transcribers, as well as other magnetic memory functions.

Previously, the cassettes were enclosed within a small plastic box or were stacked in a plurality of shelves to prevent dirt or dust exposure and damage to the surfaces thereof. It can be appreciated that the cassettes have an exposed and open area where the magnetic tape crosses a playing surface. The open cassettes can receive dust at that point. In addition thereto, dust and dirt can be imparted to the cassette through the spindle or reel. This creates a binding of the reel, thereby diminishing the quality and operational capability of the cassette.

The container 10 with the upper and lower covers 12 and 14 provides a complete enclosure to the cassette 16 when the container is closed. The closed container can be seen in FIGS. 8 and 9 as it is oriented in its closed condition with the covers 12 and 14 encapsulating the interior portion.

The covers 12 and 14 are secured and held by means of a web 20 or binding. The web or binding 20 is formed between the covers 12 and 14 in a molding process. In the alternative, the covers can be joined together by any other suitable hinging means to provide for flexibility or movement thereof. However, in this embodiment the cover 12 is joined to the web or binding 20 by means of a living hinge 24. The upper cover 14 is joined by a second living hinge 26 attached to the binding. The two respective living hinges 24 and 26 allow for the web or binding 20 to be flexed backwardly and forwardly. This provides for opening and closing of the upper and lower covers.

The web or binding 20 has an indexing member or wall 28. A wall 30 surrounds the bottom cover 12. This wall 30 indexes with the wall 28 with flange 15 fitting therein to provide for a marginal indexing, as well as a dust-free environment to the interior of the case 10.

The wall 30 surrounds the bottom cover 12 in a U-shaped manner. It has a front portion 32 and two side portions 34 and 36. The side portions 34 and 36 serve to enclose the cassettes 16 in surrounded and enclosed relationship when the covers 12 and 14 are placed in overlying relationship to each other as seen in FIG. 8.

The living hinges 24 and 26 are of sufficient flexibility and resiliency so that they will not be easily torn. However, at the same time, they are of sufficient thickness to provide for long term bending and usage thereof. The thickness and characterization of the respective living hinges 24 and 26 are dependent upon the memory of the plastic, the amount of plasticizer in the plastic, and the type of plastic. These all are subject to engineering changes, as modified by the state of the plastics art.

The covers 12 and 14 serve to hold and enclose a tray-like insert 40. The tray-like insert 40 comprises a tray-like member that has side walls 42 and 44. The sidewalls 42 and 44 terminate in slanting leading surfaces respectively 46 and 48. The slanting leading surfaces 46 and 48 provide for easy folding movement. Thus, when the insert is moved backwardly and forwardly between the covers, it can be folded and eliminate the binding of sharp corners against the inside surface of the cover 12.

Figure 3:
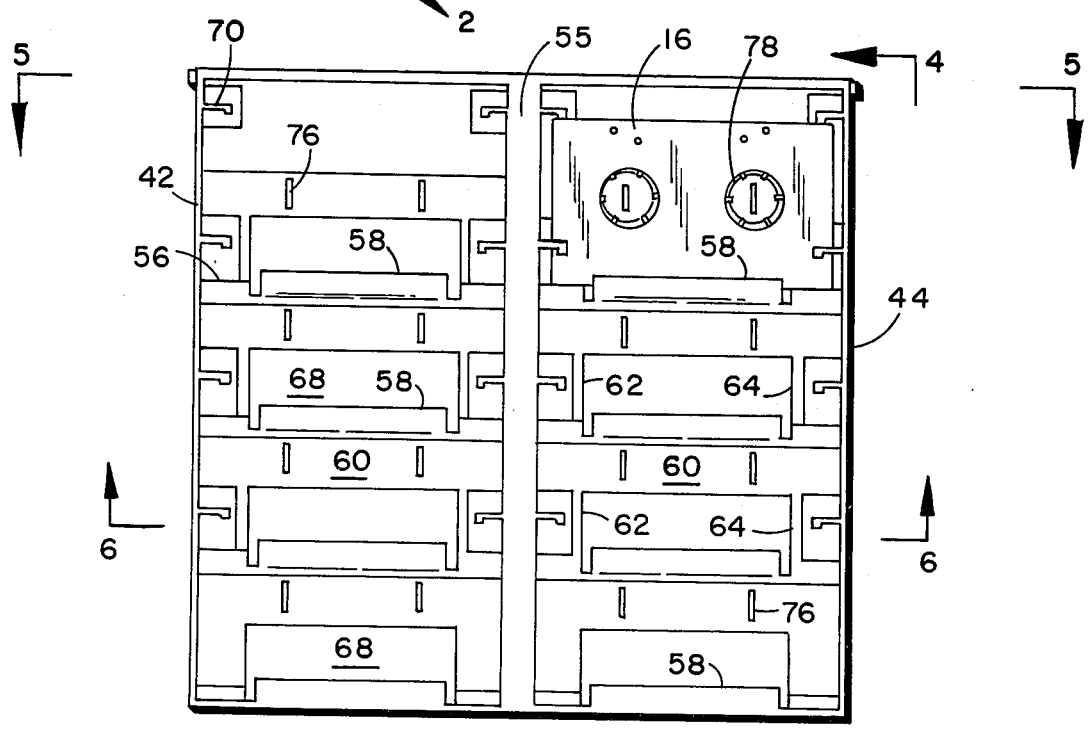
FIG. 3 shows a frontal elevation view of the tray-like insert in the direction of lines 3—3 of FIG. 2.
Figure 11:
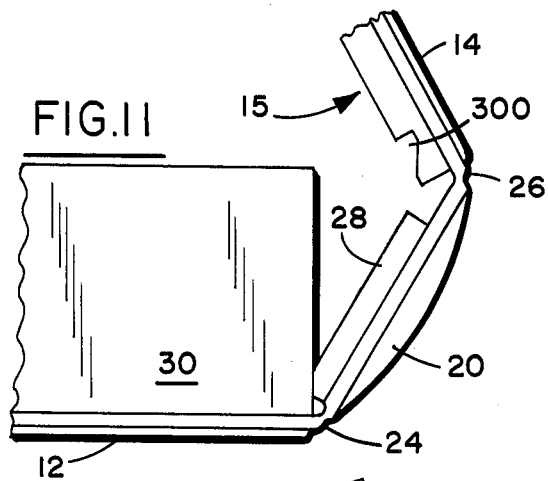
FIG. 11 shows a detailed view of the living hinge of this invention as encircled by circle 11 of FIG. 10.

The tray or insert 40 is formed with two major channels 50 and 52. These channels 50 and 52 are provided by the walls 42, 44, and a common dividing wall 55. The dividing wall 55 serves to support between it and each sidewall 42 and 44 a plurality of stepped ledges 56. The stepped ledges 56 have an upturned flange or spline 58. The upturned portion or spline 58 serves to hold the bottom marginal area of a cassette. The marginal lower surface of the cassette 16 is held behind the spline as can be seen in FIG. 1 and FIGS. 2 and 3.

The upper flange 58 which secures the lower marginal edge of the cassette 16 terminates at the ledge 56 and can be formed in an angular manner or in a vertical manner with respect to the ledge 56. The ledge 56 terminates at an upstanding wall 60 beyond the frontal margin of the ledge 56. The upstanding wall 60 is such that it is supported by webs 62 and 64 at either end thereof. The webs 62 and 64 are such that they allow for a holding of the backing member 60 which holds and indexes the cassette 16. The tray-like member 40 is made of plastic and as a consequence, an elimination of plastic material is desirable. As a consequence, spaces 68 are formed within the entire tray-like member so that the webs 62 and 64, the ledges 56, as well as the backing surface 60 are relatively limited in plastic content to avoid unnecessary plastic usage.

The cassette 16 is held on the top of the ledge 56 and against the back strut or member 62 which spans the wall 55 and walls 42 and 44. Securement is perfected by means of tabular extensions 70 which frictionally hold the top of the cassettes 16 as they rest on the ledges 56. The tabular extensions 70 are such that their lower surface 72 serves to engage the upper portion of the cassette 16. The lower surface 72 is indexed so that it flexes when the cassette 16 is inserted into the ledge area between the ledge 56 and the extensions 70.

The cassette 16 is held on the ledge 56 behind the upstanding flange 58 and is secured by the downward pressure of the tabs 72. In order to index the cassette 16, a number of tabs or projections 76 are provided. The tabs or projections 76 allow for the internal portion of a cassette, namely reel 78, to be held thereby. This prevents the reel 78 from turning. By avoiding the reel from turning, the information or placement of the respective portion of the tape when last used is assured. This avoids inadvertent movement, either through bumping or other inordinate activity, such as an item projecting into the reel 78 and thereby turning it.

It is customary for the reel 78 to have a number of internally projecting spokes. These spokes are held by the projection or tabs 76 so that they avoid turning around the tab.

To effectuate a holding, the tab 76 has a sloping downward surface and a substantially normal surface to the backing member 60. This enables the cassette 16 to be lifted and slid forwardly in a relatively facile manner. However, it should be understood that any suitable holding means can be utilized for indexing and holding the reels 78.

The foregoing staggered stepped ledges 56 allow for the placement of the cassettes 16 in a facile manner within an envelope provided by the tray-like member. The cassettes take up less cross sectional length than when they are stacked end to end or side by side. In other words, the envelope of the cross sectional thickness of the tray-like holder allows for each respective cassette 16 to be stacked under the subsequent cassette, or over the subsequent cassette, depending upon the specific orientation of top to bottom or bottom to top that is being viewed. This allows more cassettes to be inserted within the tray-like member 40. However, in addition to the foregoing, it allows the top leading edge of the cassette to rest against the inside surface of the cover 12 when the container is closed such as in the manner shown in FIGS. 8 or 9. The resting of the cassettes 16 against the bottom holds them in place until they are displayed into the position as shown in FIG. 2. As can be understood, this is a necessary requisite to prevent them from being dislodged from the frictional engagement of the tabs 70.

An alternative to the foregoing tab 70 is provided by a protuberance on walls 42 and 44. The protuberance can be a bump or expansion 80 as shown in FIG. 7. The expansion member allows for the side of the cassette 16 as opposed to the top edge of the cassette to be held against the protuberance 80. The protuberance 80 can either be at a position in front of the cassette when it is in place, or against the side of it, so long as it frictionally engages the cassette 16 to hold it in place, or blocks its movement from between the protuberance and the back span 60. As can be understood, if the protuberance 80 is in front of the cassette, the cassette must be slid over if it can expand the plastic memory of the walls 41 and 44 as they expand with respect to the inner wall 55. However, when held in place by merely a side edge relationship, the protuberances 80 can serve to merely frictionally engage the side surface to prevent movement of the cassette by gripping it tightly.

Figure 12:
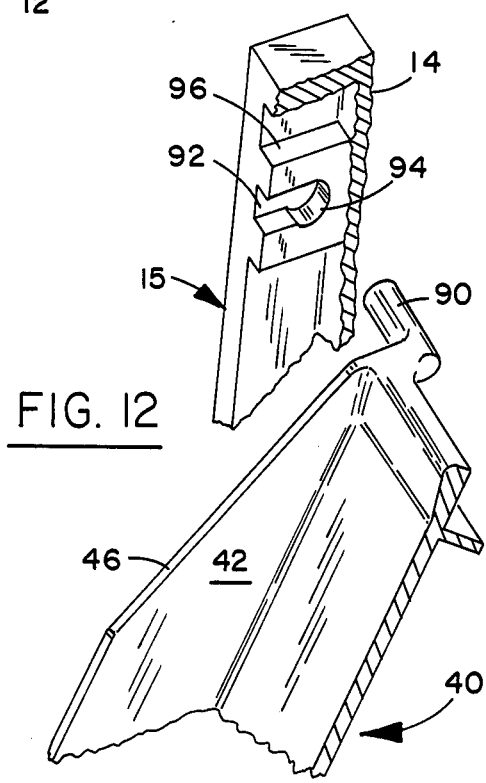
FIG. 12 shows a sectioned detailed view of the hinged pintal for hinging the insert to the cover.

The tray-like member 40 is secured to the upper member as shown in FIG. 12. The tray-like member 40 has a pintal 90 which engages a slot 92 and a rounded opening 94. The slot 94 is placed in the edge region of the cover 14. The slot 92 and rounded opening 94 are formed in a boss 96, which is molded into the side portion of the cover 14. The rounded opening can be a pierced hole passing all the way through the flange 15 with the pintal fitting therein. This provides free movement of the pintal 90 for pivotal swinging action.

Figure 10:
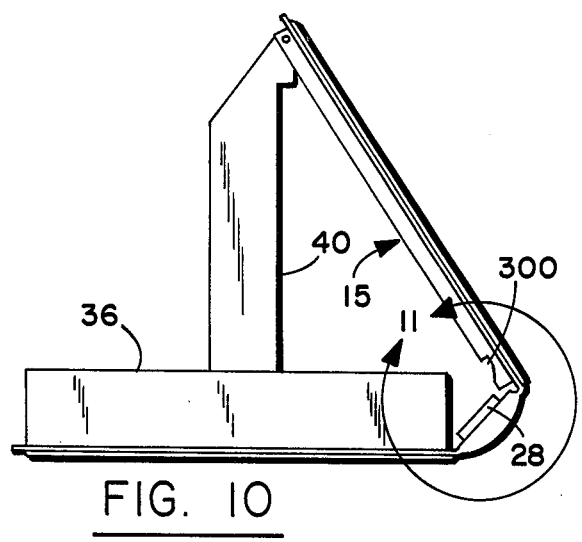
FIG. 10 shows a side view of the enclosure with the tray-like insert in the upright position being folded between the upper and lower covers.

The entire swinging action afforded the cover 14 as hinged to the pintals 90 allow for movement so that the tray-like member 40 can swing backwardly into the position of being placed within the entire container or enclosure 10. As can be seen in FIG. 10, the tray-like insert 40 is being moved backwardly and is in an over-center position during the course of its movement toward the folded position which is completely enclosed within the enclosure 10. The flange 28 of the binding 20 serves to rigidify and hold the tray-like member from lateral movement and strengthen the entire tray when it is in its folded position.

Figure 9:
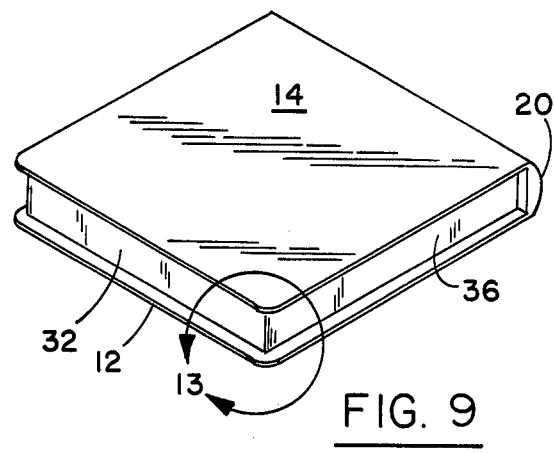
FIG. 9 shows a top perspective view of the enclosure with the covers closed.
Figure 13:
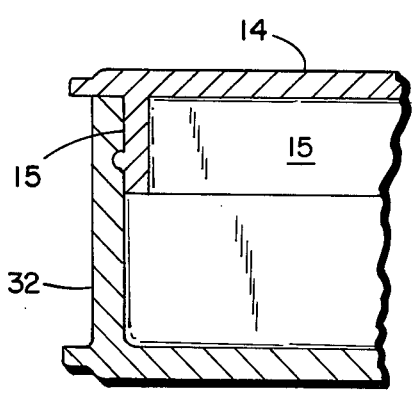
FIG. 13 shows a sectional view of the frictional securement tongue and groove through circle 13 of FIG. 9 for holding the covers together when closed; and, FIG. 14 shows a displaced view of the tongue and groove of FIG. 13.
Figure 14:
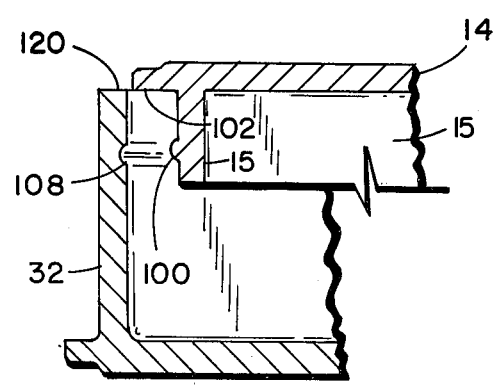

Looking more particularly at FIGS. 13 and 14, a detailed showing of the locking mechanism as encircled by circle 13 of FIG. 9 is shown. In particular, the top 14 of the container is shown having its depending flange or spline 15. The depending flange or spline 15 has a ledge 102 along the front of the top cover 14. A portion of the depending wall 15 has a bead 100. The bead 100 allows the depending wall 15 to be inserted or biased by the plastic memory of the material into a groove 108. The groove 108 is in the upstanding portion of the wall 32. Thus, the top of the wall 32, namely top 120, is in close juxtaposition to the inside surface 102 and is forced internally by the flexible nature of the plastic of the bead 100 engaging groove 108.

In order to provide for the foregoing locking effect, a notch or "V" shaped opening 300 is cut into the flange 15. The notch has a side 302 that is normal to flange 15 and a sloping surface 304 that is angular. The normal surface 302 overrides a rib 308 that is on the interior of wall 30. The rib 308 and notch 300 when the cover 14 is closed cause the cover to be indexed with the surface 302 engaging the rib in a locking manner. The forward thrust of surface 302 engaging rib 308 causes an increased bias of the flange 15 against wall 32, so that bead 100 engages slot 108 more securely.

Looking more particularly at FIG. 9, it can be seen that the storage of the entire container is provided by merely a folded book effect wherein the top cover 14 and the bottom cover 12 are analogous to the covers of a book having a binding or web 20. Thus, the magnetic cassette holder can be stacked like a series of books when the two respective portions are held together, or they can be stacked in the manner of a series of boxes.

In addition to the foregoing cassettes, the holder can store smaller cassettes and mini digital cartridges. Thus, variously configured cartridges and rectangular magnetic memory devices can be secured and held in the container.

From the foregoing, it can be seen that the invention is a broad step over the prior art, insofar as it provides storage for memory cassettes. Furthermore, the easy and facile compact storage with the display thereof when shown in the manner of FIGS. 1 and 2 creates a readily usable inventive device over the prior art. As a consequence, the invention should be read broadly in light of the following claims for covering the encapsulation, storage, containerization and display of magnetic cassettes.

I claim:

1. A container for holding magnetic memory cassettes comprising:
    a first cover;
    a second cover hinged to said first cover;
    an insert pivotally attached to one of said covers to allow said insert to be folded inwardly between said first and second cover having a plurality of ledges upon which said cassettes can rest;
    a web between said first and second cover forming a hingelike member therebetween so that the covers can be folded inwardly and opened outwardly;
    a wall on one of said covers surrounding at least a portion of the periphery thereof on the internal side between said covers in their overlying relationship for purposes of surrounding the insert at least in part;
    backing for receiving cassettes thereagainst when they are on said ledges; and,
    protuberances for frictionally engaging a portion of said cassettes when they are placed on said ledges.

2. The container as claimed in claim 1 further comprising:
    tabs forming said protuberances adapted for extending over said cassettes for holding said cassettes in frictional engagement with the ledges.

3. The container as claimed in claim 2 further comprising:
    an upstanding flange on said ledges to secure said cassettes from sliding outwardly over said ledges.

4. The container as claimed in claim 3 further comprising:
    said insert having a central common wall to provide two series of ledges for receiving said cassettes thereon spanning the common wall; and wherein, said ledges are placed in a manner so that the cassettes are in staggered underlying relationship at least in part; and,
    at least one tab extending from said backing between said sidewalls for receipt within the reels of said cassettes to prevent the turning thereof.

5. A magnetic memory cassette holder comprising:
    a first cover;
    a second cover;
    means for hinging each of said covers in spaced relationship therefrom in the form of a webbed living hinge;
    an insert hinged to one of said covers for swinging movement internally of said covers when they are in their hinged relationship comprising:
    ledges extending between the edges of said insert;
    an upstanding backing from said ledges for receiving cassettes placed on the ledges backed up against said backing; and,
    at least one frictional engaging protuberance for engaging the cassettes along their edges for holding said cassettes against said ledges in their overlapping or underlying relationship to said cassettes.

6. The container as claimed in claim 5 wherein said frictional engagement means comprises:
    a protuberance extending from at least one of said walls for holding said cassette in engagement between the common wall and said side walls.

7. The container as claimed in claim 5 further comprising:
    a protuberance formed as a tab for engaging the edge of said cassette in frictional engagement against the ledge under said cassette on which it is resting.

8. The container as claimed in claim 7 further comprising:
    an extension from said ledge upwardly for holding the bottom margin of said cassette from sliding over said ledge.

9. The container as claimed in claim 8 wherein:
    said ledges are formed in a manner to stagger the cassettes in overlying relationship to each other as they rest on said ledges.

10. The combination of a magnetic memory cassette and a container for storing said cassette comprising:
    a magnetic cassette;
    a first cover;
    a second cover hinged to said first cover by means of a web providing a living hinge securing said first and second covers together so that they can open in a book-like manner whereby the covers are spaced from each other;
    a wall surrounding at least in part the general peripheral region of one of said covers and in upstanding relationship therefrom for extending between a portion of said first and second covers when said covers are in overlying relationship to each other;
    an insert hinged to said second cover for folding inwardly against said second cover so that when said first and second covers are in overlying relationship, said tray-like member is implaced within said upstanding walls of said first cover;
    a plurality of ledges within said insert for receipt of a cassette thereon with a wall at the leading edge of said ledges forming a channel for said cassettes; and,
    protuberances for engagingly frictionally holding the cassettes against the top or the bottom of said ledges.

11. The container as claimed in claim 10 further comprising:
    a member adapted for receipt of the back of said cassette when it is implaced on said ledge; and,
    protuberances comprising tabs which extend over said cassettes which serve to secure the cassettes therebetween.

12. The container as claimed in claim 11 wherein:

said protuberances are adapted to be pushed in an expanding manner when cassettes are pushed thereagainst and which snap over the frontal portion of said cassette when the cassette is on said ledge.

13. The container as claimed in claim 10 further comprising:
said ledges are in staggered relationship so as to allow said cassettes to be placed in overlying staggered relationship within said channels.

* * * * *